United States Patent
Thomsen

(10) Patent No.: US 12,081,154 B2
(45) Date of Patent: Sep. 3, 2024

(54) VARIABLE SPEED DRIVE FOR A COMPRESSOR MODULE

(71) Applicant: MOTOR COMPETENCE CENTER HOLDING FLENSBURG GMBH, Flensburg (DE)

(72) Inventor: Rune Thomsen, Logumkloster (DK)

(73) Assignee: MOTOR COMPETENCE CENTER HOLDING FLENSBURG GMBH, Flensburg (DE)

( * ) Notice: Subject to any disclaimer, the term of this patent is extended or adjusted under 35 U.S.C. 154(b) by 188 days.

(21) Appl. No.: 17/802,768

(22) PCT Filed: Feb. 26, 2021

(86) PCT No.: PCT/EP2021/054874
§ 371 (c)(1),
(2) Date: Aug. 26, 2022

(87) PCT Pub. No.: WO2021/170820
PCT Pub. Date: Sep. 2, 2021

(65) Prior Publication Data
US 2023/0109748 A1 Apr. 13, 2023

(30) Foreign Application Priority Data
Feb. 28, 2020 (EP) ..................... 20160006

(51) Int. Cl.
*H02P 29/024* (2016.01)
(52) U.S. Cl.
CPC .... *H02P 29/0241* (2016.02); *F25B 2600/021* (2013.01)

(58) Field of Classification Search
CPC ..... H02M 3/04; H02M 7/44; F25B 2600/021; F25B 49/025; F25B 2600/0253;
(Continued)

(56) References Cited

FOREIGN PATENT DOCUMENTS

| CN | 110601531 A | 12/2019 |
|---|---|---|
| EP | 1796242 A1 | 6/2007 |

(Continued)

OTHER PUBLICATIONS

Miyauchi Hiroshi et al., Photovoltaic Generating Set, Sep. 22, 2005, Clarivate Analytics, pp. 1-31 (Year: 2005).*
(Continued)

*Primary Examiner* — Antony M Paul
(74) *Attorney, Agent, or Firm* — Workman Nydegger

(57) ABSTRACT

A variable speed drive comprises a voltage filter and voltage polarity protection unit including 1) a voltage filter circuit configured for low-pass filtering a voltage of an associated DC voltage source, and 2) a voltage polarity protection circuit configured to prevent incorrect polarity parring between the variable speed drive and the associated DC voltage source; a DC power supply unit being operatively connected to the voltage filter and voltage polarity protection unit via at least a positive polarity connection; an inverter unit being operatively connected to the DC power supply unit, a controllable load dump inserted in series with the positive polarity connection between the voltage filter and voltage polarity protection unit and the DC power supply unit, and a control unit configured to control at least the DC power supply unit, the inverter unit and the controllable load dump.

15 Claims, 1 Drawing Sheet

(58) Field of Classification Search
CPC ...... F25B 1/00; F25B 13/00; F25B 2700/151; F25B 31/026; F25B 27/005; F25B 2700/171; H02P 27/00; H02P 27/04; H02P 27/06; H02P 27/08; H02P 27/085; H02P 23/28; H02P 29/0241; H02P 29/027; H02P 29/028; H02P 29/02; H02P 25/03; H02P 25/032; H02P 25/062; H02P 25/064; H02P 29/032; H02P 25/024; H02P 27/047; H02P 2201/03; H02P 25/022; H02P 1/10; H02P 1/24

See application file for complete search history.

(56) References Cited

FOREIGN PATENT DOCUMENTS

| | | | | |
|---|---|---|---|---|
| JP | H1159159 A | | 3/1999 | |
| JP | 2005261082 A | * | 9/2005 | ............. Y02E 10/50 |
| WO | 2018005998 A1 | | 1/2018 | |
| WO | 2019021128 A1 | | 1/2019 | |

OTHER PUBLICATIONS

Search Report from corresponding European Application No. EP 20160006, Aug. 14, 2020.
International Search Report from PCT Application No. PCT/EP2021/054874, Jul. 19, 2021.

* cited by examiner

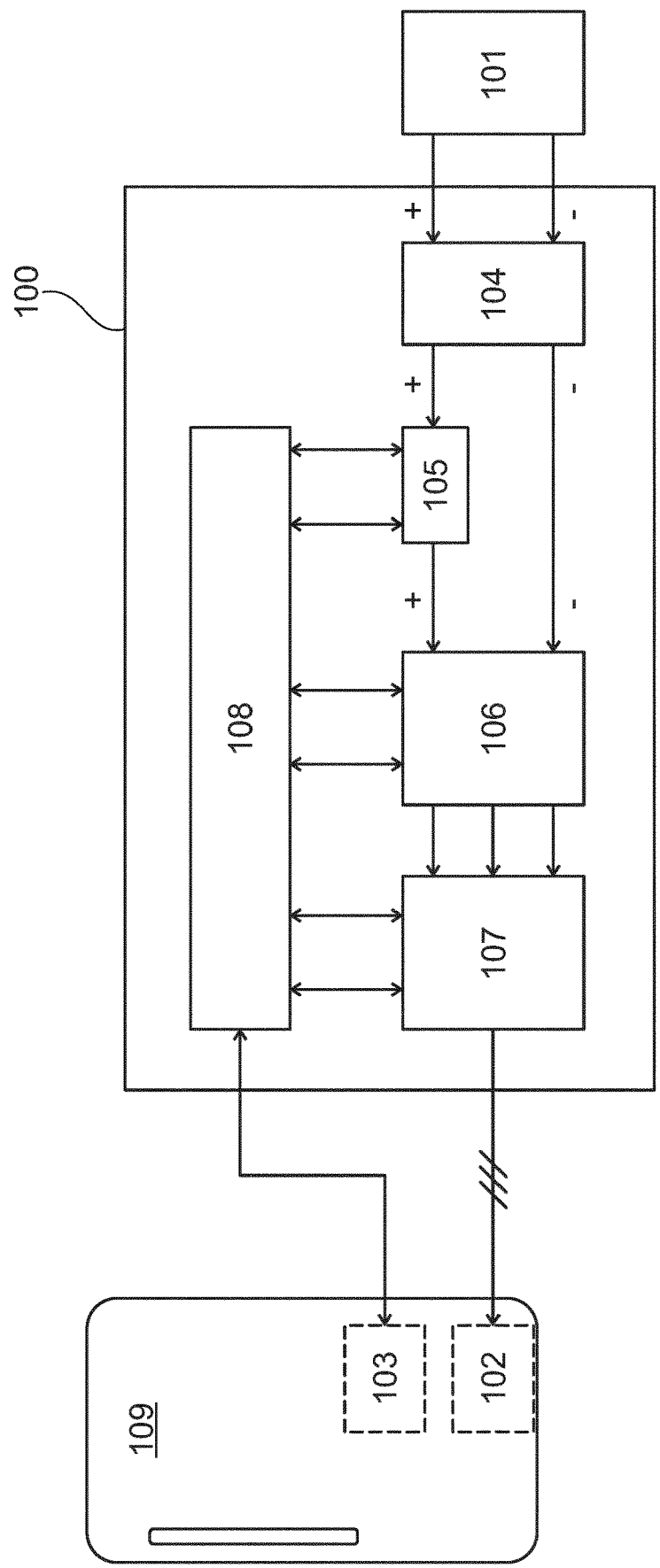

VARIABLE SPEED DRIVE FOR A COMPRESSOR MODULE

FIELD OF THE INVENTION

The present invention relates to a variable speed drive for driving a compressor module comprising a brushless DC motor and a reciprocating compressor. The compressor module typically forms part of a compact and mobile refrigerator system. In particular, the present invention relates to a variable speed drive allowing minimum standby power consumption, avoiding or at least reducing undesired inrush currents and providing a constant and well-defined common negative/neutral voltage reference point.

BACKGROUND OF THE INVENTION

Compact and mobile refrigerator systems suitable for being installed in for example trucks, yachts, caravans etc. are typically powered by DC voltage sources, such as batteries and/or photovoltaic systems. As the amount of available power in such systems are restricted issues like minimum standby power consumption, over-voltage protection, and the avoidance of undesired inrush currents are of great importance.

It may be seen as an object of embodiments of the present invention to provide a variable speed drive configured for minimum standby power consumption.

It may be seen as a further object of embodiments of the present invention to provide a variable speed drive configured for avoiding or at least reducing undesired inrush currents.

It may be seen as an even further object of embodiments of the present invention to provide a variable speed drive comprising an over-voltage protection arrangement.

It may be seen as an even further object of embodiments of the present invention to provide a variable speed drive with a constant and well-defined common negative/neutral voltage reference point.

DESCRIPTION OF THE INVENTION

The above-mentioned objects are complied with by providing, in a first aspect, a variable speed drive adapted to drive a compressor module, wherein the variable speed drive comprises
 a) a voltage filter and voltage polarity protection unit comprising 1) a voltage filter circuit configured for low-pass filtering a voltage of an associated DC voltage source, and 2) a voltage polarity protection circuit configured to prevent incorrect polarity parring between the variable speed drive and the associated DC voltage source,
 b) a DC power supply unit being operatively connected to the voltage filter and voltage polarity protection unit via at least a positive polarity connection,
 c) an inverter unit being operatively connected to the DC power supply unit, the inverter unit being configured to provide a multi-phase voltage output for driving the compressor module,
 d) a controllable load dump inserted in series with the positive polarity connection between the voltage filter and voltage polarity protection unit and the DC power supply unit, and
 e) a control unit configured to control at least the DC power supply unit, the inverter unit and the controllable load dump.

Thus, the present invention relates to an advantageous variable speed drive for driving a compressor module of for example a compact and mobile refrigerator system with variable rotational speeds. The variable speed drive of the present invention is advantageous in that it ensures minimum standby power consumption, provides over-voltage protection, avoids or at least reduces undesired inrush currents and provides a constant and well-defined common negative/neutral voltage reference point. The compressor module of compact and mobile refrigerator system may comprise a brushless DC motor and a reciprocating compressor being.

The voltage filter may comprise an EMI filter for removing voltage transients, such as noise transients. The control unit may be implemented in the form of a microprocessor so that the functionality of the control unit is performed by a microprocessor.

The load dump may comprise a controllable switch, such as a MOSFET, adapted to be operated in at least a conducting state of operation, a non-conducting state of operation, or a modulated state of operation. A control signal in the form of a gate signal may be provided by the control unit in order to set in which state of operation (conducting, non-conducting or modulated) the controllable switch should be in. In the conducting state of operation of the MOSFET the drain and source are connected, whereas in the non-conducting state of operation of the MOSFET the drain and source are disconnected.

The controllable switch of the load dump may be adapted to be operated in the conduction state of operation while actively driving the compressor module. In the present context actively driving should be taken to mean that power of a certain frequency and amplitude is supplied to the compressor module from the inverter unit. The inverter unit may comprise a controllable B6 inverter bridge, and wherein the inverter unit may be configured to provide a three-phase voltage output, such as a three-phase AC voltage output, for driving the compressor module. The three-phase voltage output may also take other shapes, such as rectangular/box shapes.

The controllable switch of the load dump may be adapted to be operated in the non-conduction state of operation during standby operation of the variable speed drive in order to minimise standby losses, or during an over-voltage event at the load dump in order to protect the DC power supply unit. Minimising standby losses is advantageous in that the variable speed drive of the present invention is typically used in relation to battery driving refrigerator systems installed in for trucks and yachts. Over-voltage protection of the DC power supply unit is also advantageous as it protects the DC power supply unit if the voltage at the load dump increases to undesired and damaging voltage levels.

The controllable switch of the load dump may be adapted to be operated in the modulated state of operation in order to avoid or at least reduce undesired inrush currents after the controllable switch has been in a non-conducting state of operation. As addressed above the controllable switch may be in a non-conduction state of operation in relation to standby operation, or in relation to an over-voltage event in order to protect the DC power supply unit. The modulated state of operation of the controllable switch may involve that the controllable switch is operated in accordance with a given PWM pattern having a switching frequency in the range of 5-120 kHz, such as in the range of 5-10 kHz, or such as in the range of 30-120 kHz. It should be noted that other switching frequency ranges may also be applicable.

The voltage polarity protection circuit may also comprise a controllable switch, such as a MOSFET, adapted to disconnect the variable speed drive from the associated DC voltage source in case of an incorrect polarity parring between the two. Thus, if for some reason the plus polarity terminal of the DC voltage source is connected to the negative polarity terminal of the variable speed drive, and the negative polarity terminal of the DC voltage source is connected to the plus polarity terminal of the variable speed drive the controllable switch disconnects the variable speed drive from the DC voltage source in order to avoid damages.

The power supply unit may comprise a capacitor and/or a controllable DC/DC converter, such as a step-up converter or step-down converter. The capacitor of the power supply unit may be adapted for voltage smoothening purposes. The controllable DC/DC converter may be adapted to provide a variable DC voltage to the inverter unit in response to control signals from the controlled unit.

The control unit may be configured to receive and provide information from/to a thermostat of an associated refrigeration unit, said refrigeration unit comprising the compressor module. Thus, the control unit may be configured to form a control loop where information from a thermostat, such as a measured temperature, may be used to at least partly control the load dump, the power supply unit and/or the inverter unit.

The variable speed drive of the present invention may be configured to be connected to a DC voltage source having a nominal voltage in the range between 8 V and 40V, such as approximately 12 V or such as approximately 24 V, which are typical nominal DC voltage levels of battery systems of for example trucks and/or yachts.

In a second aspect the present invention relates to a method for operating a variable speed drive according to the first aspect, the method comprising the step of operating a controllable switch, such as a MOSFET, of the load dump in a non-conducting state of operation if a voltage at the load dump exceeds a predetermined threshold level. In the non-conducting state of operation of a MOSFET the drain and source are disconnected. The predetermined threshold voltage level may for example be 17 V in case the nominal voltage level is approximately 12 V. In case the nominal voltage level is approximately 24 V the predetermined threshold voltage level may be 32 V. Alternatively, the predetermined threshold voltage level may be for example 36 V and independent of the nominal voltage level.

In a third aspect the present invention relates to a method for operating a variable speed drive according to the first aspect, the method comprising the step of operating a controllable switch, such as a MOSFET, of the load dump in a non-conducting state of operation in order to operate the variable speed drive in a standby mode and minimise standby losses. When the variable speed drive is in standby mode no power is provided from the inverter unit to the compressor module.

In a fourth aspect the present invention relates to a method for operating a variable speed drive according to the first aspect, the method comprising the step of operating a controllable switch, such as a MOSFET, of the load dump in a modulated state of operation in order to avoid or at least reduce inrush currents after the controllable switch has been in a non-conducting state of operation. In the modulated state of operation the controllable switch may be operated in accordance with a given PWM pattern having a switching frequency in the range of 5-120 KHz, such as in the range of 5-10 kHz, or such as in the range of 30-120 kHz. It should be noted that other switching frequency ranges may also be applicable.

In a fifth aspect the present invention relates to a mobile refrigerator system comprising a variable speed drive according to the first aspect and a refrigerator unit comprising a compressor module including a brushless DC motor and a reciprocating compressor.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWING

The present invention will now be described in further details with reference to the accompanying FIGURE, wherein FIG. 1 shows a block diagram of a variable speed drive according to the present invention.

While the invention is susceptible to various modifications and alternative forms a specific embodiment has been shown by way of example in FIG. 1 and will be described in details herein. It should be understood, however, that the invention is not intended to be limited to the particular form disclosed. Rather, the invention is to cover all modifications, equivalents, and alternatives falling within the spirit and scope of the invention as defined by the appended claims.

DETAILED DESCRIPTION OF THE INVENTION

In general, the present invention relates to a variable speed drive for driving a compressor module comprising a brushless DC motor and a reciprocating compressor. The compressor module typically forms part of compact and mobile refrigerator systems. Such compact and mobile refrigerator systems are suitable for being installed in for example trucks, yachts, caravans etc. where they are typically powered by DC voltage sources, such as batteries and/or photovoltaic systems. The variable speed drive of the present invention is advantageous in that it ensures minimum standby power consumption, provides over-voltage protection, avoids or at least reduces undesired inrush currents and provides a constant and well-defined common negative/neutral voltage reference point.

Referring now to FIG. 1 a block diaphragm of the variable speed drive 100 of the present invention is depicted. As seen in FIG. 1 the variable speed drive 100 is electrically connected to an associated voltage source 101 which, in principle, may involve any kind of DC voltage source, such as one or more batteries, one or more photovoltaic cells etc. The DC voltage source may, in general, have a terminal voltage between 8 V and 40 V. Typically the DC voltage source has a nominal terminal voltage of approximately 12 V or approximately 24 V. Although the variable speed drive 100 in FIG. 1 is electrically connected directly to a DC voltage source it should be noted that AC voltage sources, such as generator systems including a rectifier, may also be electrically connected to the variable speed drive 100.

The compressor module 102 typically involves a brushless DC motor and a reciprocating compressor which, as already addressed, both form part of compact and mobile refrigerator systems 109. The brushless DC motor of the compressor module 102 is, as depicted in FIG. 1, driving by a three-phase voltage output from an inverter unit 107 of the variable speed drive 100. The three-phase voltage output from an inverter unit 107 may be a three-phase AC voltage output. The three-phase voltage output may however also take other shapes, such as rectangular/box shapes. The implementation of the inverter unit 107 will be discussed in further details below.

As already mentioned the compressor module 102 may form part of compact and mobile refrigerator systems 109. In order to control the temperature of the refrigerator system 109 a thermostat 103 of the refrigerator system 109 communicates with a control unit 108 of the variable speed drive 100 via a feedback loop.

The variable speed drive 100 depicted in FIG. 1 comprises a voltage filter and voltage polarity protection unit 104 being electrically connected to the associated voltage source 101 which may be of the type mentioned above. The voltage filter and voltage polarity protection unit 104 comprises an EMI filter circuit configured for low-pass filtering a voltage from the associated voltage source 101. The EMI filter circuit typically has a cut-off frequency so that undesired voltage/noise transients are effectively suppressed.

The voltage filter and voltage polarity protection unit 104 further comprises a voltage polarity protection circuit configured to prevent incorrect polarity parring between the variable speed drive 100 and the associated voltage source 101, i.e. prevent that the plus and negative polarities of the associated voltage source 101 are exchanged by mistake. The low-pass voltage filter circuit may be implemented in various ways, including, but not limited to, a passive RC voltage filter circuit. The voltage polarity protection circuit is implemented using a controllable switch, such as a MOSFET, adapted to disconnect the variable speed drive 100 from the associated voltage source 101 in case of an incorrect polarity parring between the two.

The variable speed drive 100 further comprises a DC power supply unit 106 being operatively connected to the voltage filter and voltage polarity protection unit 104 via a positive polarity connection and a common negative/neutral connection. The common negative/neutral connection forms a well-defined negative/neutral potential for the various units 104, 106, 107, 108 of the variable speed drive 100 and the units 101, 102, 103 operatively connected to the variable speed drive 100. The power supply unit typically comprises a capacitor optionally in combination with a controllable DC/DC converter, such as a step-up converter and/or step-down converter. The controllable DC/DC converter is adapted to provide a variable DC voltage to an inverter unit 107. The variable DC voltage of the controllable DC/DC converter, and thereby the DC voltage level provided to the inverter unit 107, is controlled by the controlled unit 108.

The variable speed drive 100 further comprises an inverter unit 107 being operatively connected to the DC power supply unit 106. The inverter unit 107 is configured to provide a multi-phase voltage output for driving the brushless DC motor of the compressor module 102. The inverter unit 107 comprises a controllable B6 inverter bridge configured to provide a three-phase voltage output with a variable frequency in order to vary the rotational speed of the brushless DC motor of the compressor module 102. The inverter unit 107 is controlled by the control unit 108.

As depicted in FIG. 1 the control unit 108, which in FIG. 1 is implemented as a microprocessor, is configured to control at least the DC power supply unit 106, the inverter unit 107 and a controllable load dump 105 which is inserted in series with the positive polarity connection between the voltage filter and voltage polarity protection unit 104 and the DC power supply unit 106.

As it will be disclosed in the following there are several advantages associated with the controllable load dump 105 and, in particular, its position in the positive polarity connection between the voltage filter and voltage polarity protection unit 104 and the DC power supply unit 106.

Since the controllable load dump 105 is positioning in series with the positive polarity connection between the voltage filter and voltage polarity protection unit 104 and the DC power supply unit 106, the common negative/neutral connection between the same units 104, 106 remains unbroken at all times and thus defines a well-defined and shared negative/neutral potential for the entire variable speed drive 100 and the associated units 101, 102, 103 operatively connected thereto.

The load dump 105 comprises a controllable switch adapted to be operated in at least three states of operation—namely a conducting state of operation, a non-conducting state of operation, or a modulated state of operation. The controllable switch of the load dump 105 is a MOSFET having its drain and source operatively connected to the voltage filter and voltage polarity protection unit 104 and the DC power supply unit 106, respectively. The gate of the MOSFET is controlled by the control unit 108.

In the conducting state of operation the controllable switch is closed and there is thus an unbroken connection between the voltage filter and voltage polarity protection unit 104 and the DC power supply unit 106. The controllable switch will be in the conducting state of operation while actively driving the brushless DC motor and the compressor of the compressor module 102. In the non-conducting state of operation the controllable switched is open and as a consequence the voltage filter and voltage polarity protection unit 104 is disconnected from the DC power supply unit 106. The controllable switch will for example be in the non-conducting state of operation during an over-voltage event at the load dump 105 in order to protect the DC power supply unit 106. An over-voltage event occurs when the voltage level at the load dump 105 exceeds a predetermined threshold voltage level above a nominal voltage level at the load dump 105. In a first example, the predetermined threshold voltage level may be 17 V in case the nominal voltage level is approximately 12 V. In a second example, the predetermined threshold voltage level may be 32 V in case the nominal voltage level is approximately 24 V. Alternatively, the predetermined threshold voltage level may be for example 36 V and independent of the nominal voltage level. The controllable switch of the load dump 105 may also be in the non-conduction state of operation during standby operation of the variable speed drive 100 in order to minimise standby losses. During standby operation the variable speed drive 100 provides no power to the brushless DC motor of the compressor module 102. In the modulated state of operation the controllable switch is conducting/non-conducting in accordance with a given PWM pattern being set by the control unit 108. The controllable switch of the load dump 105 may, in principle, be any kind of electrically controllable switch, such as a MOSFET. The modulated state of operation of the controllable switch may be used to avoid or at least reduce undesired inrush currents after the controllable switch has been in a non-conducting state of operation.

In conclusion, the implementation and, in particular, the positioning of the load dump 105 in the variable speed drive 100 of the present invention is advantageous for several reasons—including that the load dump 105 is arranged in the positive polarity connection between the voltage filter and voltage polarity protection unit 104 and the DC power supply unit 106 whereby the common negative/neutral connection between the same units 104, 106 remain unbroken at all times. Moreover, the load dump 105 may disconnect the voltage filter and voltage polarity protection unit 104 from the DC power supply unit 106 in order to 1) reduce standby power losses, and 2) protect the DC power supply unit 106 against over-voltage events detected at the load dump 105. Even further, undesired inrush currents may be avoided or at least reduced by operating a controllable switch of the load dump 105 in accordance with a given modulation/PWM pattern.

The invention claimed is:

1. A variable speed drive adapted to drive a compressor module, wherein the variable speed drive comprises:
   (a) a voltage filter and voltage polarity protection unit comprising (1) a voltage filter circuit configured for low-pass filtering a voltage of an associated DC voltage source, and (2) a voltage polarity protection circuit configured to prevent incorrect polarity parring between the variable speed drive and the associated DC voltage source;
   (b) a DC power supply unit being operatively connected to the voltage filter and voltage polarity protection unit via at least a positive polarity connection,
   (c) an inverter unit being operatively connected to the DC power supply unit, the inverter unit being configured to provide a multi-phase voltage output for driving the compressor module;
   (d) a controllable load dump inserted in series with the positive polarity connection between the voltage filter and voltage polarity protection unit and the DC power supply unit; and
   (e) a control unit configured to control at least the DC power supply unit, the inverter unit and the controllable load dump.

2. The variable speed drive according to claim 1, wherein the load dump comprises a controllable switch adapted to be operated in at least a conducting state of operation, a non-conducting state of operation, or a modulated state of operation.

3. The variable speed drive according to claim 2, wherein the controllable switch of the load dump is adapted to be operated in the conduction state of operation while actively driving the compressor module.

4. The variable speed drive according to claim 2, wherein the controllable switch of the load dump is adapted to be operated in the non-conduction state of operation during standby operation of the variable speed drive in order to minimize standby losses, or during an over-voltage event at the load dump in order to protect the DC power supply unit.

5. The variable speed drive according to claim 2, wherein the controllable switch of the load dump is adapted to be operated in the modulated state of operation in order to avoid or at least reduce undesired inrush currents after the controllable switch has been in a non-conducting state of operation.

6. The variable speed drive according to claim 5, wherein the controllable switch, in the modulated state of operation, is adapted to be operated in accordance with a given PWM pattern having a switching frequency in the range of 5-120 KHz.

7. The variable speed drive according to claim 1, wherein the voltage polarity protection circuit comprises a controllable switch adapted to disconnect the variable speed drive from the associated DC voltage source in case of an incorrect polarity parring between the two.

8. The variable speed drive according to claim 1, wherein the power supply unit comprises a capacitor and/or a controllable DC/DC converter.

9. The variable speed drive according to claim 1, wherein the inverter unit comprises a controllable B6 inverter bridge, and
   wherein the inverter unit is configured to provide a three-phase voltage output for driving the compressor module.

10. The variable speed drive according to claim 1, wherein the control unit is configured to receive and provide information from/to a thermostat of an associated refrigeration unit, said refrigeration unit comprising the compressor module.

11. The variable speed drive according to claim 1, wherein the variable speed drive is configured to be connected a DC voltage source having a nominal voltage in the range between 8 V and 40V.

12. A method for operating a variable speed drive according to claim 1, the method comprising the step of operating a controllable switch of the load dump in a non-conducting state of operation if a voltage at the load dump exceeds a predetermined threshold level.

13. The method for operating a variable speed drive according to claim 1, the method comprising the step of operating a controllable switch of the load dump in a non-conducting state of operation in order to operate the variable speed drive in a standby mode and minimize standby losses.

14. The method for operating a variable speed drive according to claim 1, the method comprising the step of operating a controllable switch of the load dump in a modulated state of operation in order to avoid or at least reduce inrush currents after the controllable switch has been in a non-conducting state of operation.

15. A mobile refrigerator system comprising a variable speed drive according to claim 1 and a refrigerator unit comprising a compressor module including a brushless DC motor and a reciprocating compressor.

* * * * *